United States Patent Office 3,091,793
Patented June 4, 1963

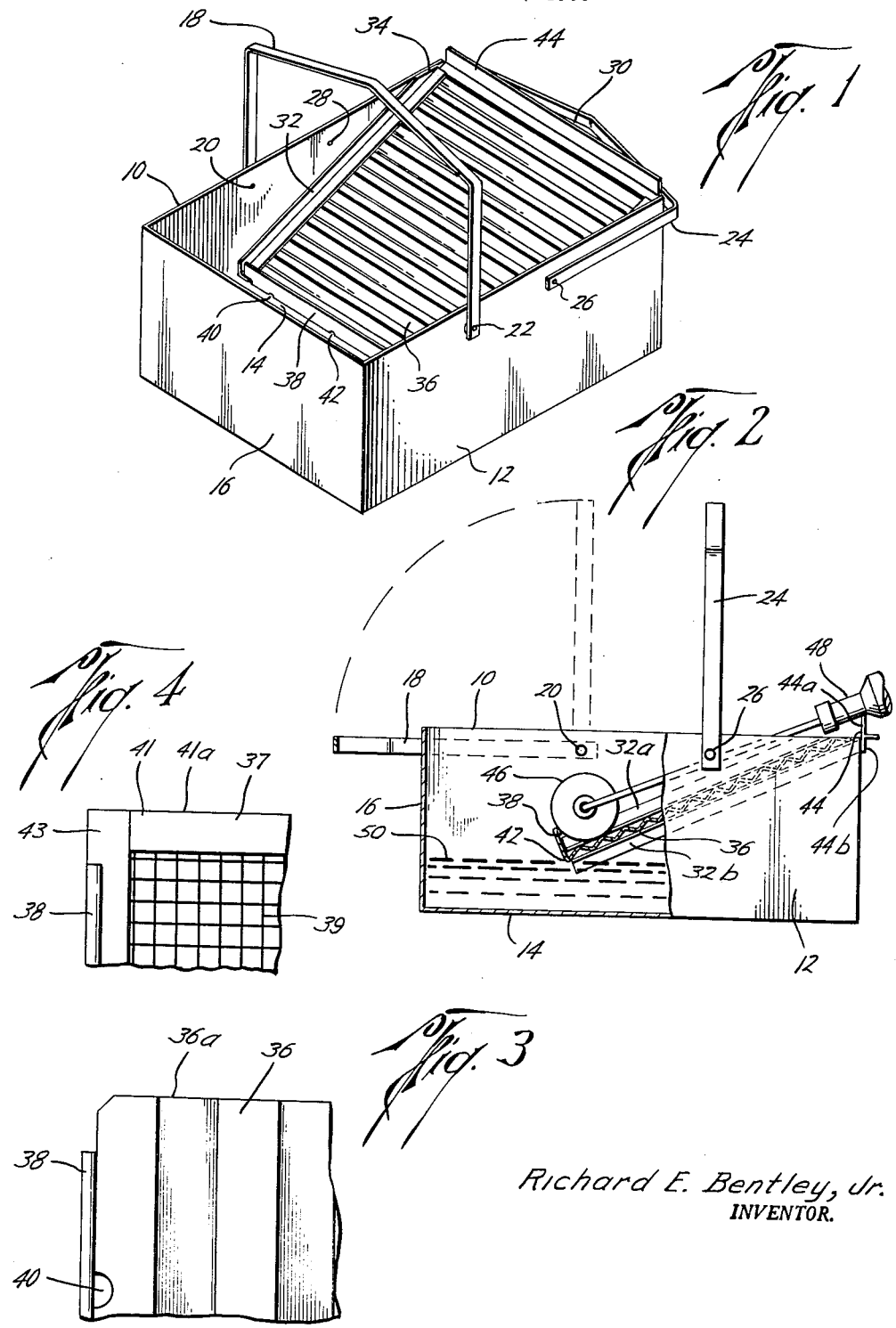

3,091,793
PAINT CONTAINER DEVICE
Richard E. Bentley, Jr., Denison, Tex., assignor to Texas Paint Supply Company, a corporation of Texas
Filed Oct. 7, 1960, Ser. No. 61,247
2 Claims. (Cl. 15—257.06)

This invention pertains generally to containers and particularly to a device for providing a uniform coating to a roller.

During recent years, the use of rollers to apply liquids such as paints to surfaces has increased appreciably, primarily because of the uniform coating provided by rollers and also because of the decreased amount of time required to do a particular job with a roller instead of a brush. However, the containers which have been available for use with rollers have not been of optimum design. Containers and devices used with rollers have had limited liquid capacity as well as undesirable configurations which do not allow the container or device to be used in many ways without danger of spilling. Known containers also have not provided means for adequately insuring that a uniform coating of liquids of various textures is applied to the roller in sufficient quantity to cover a large surface area. Also some of the known containers allow the roller and the roller handle to become saturated with liquid when the roller is placed in the containing device.

Thus it is an object of the present invention to provide a liquid container device which may be suspended in air or placed on a relatively flat surface without sacrifice in the liquid carrying capacity of such device.

Another object of the present invention is to provide a container device which has a removable tray for removing excess liquid from a roller.

Still another object of the present invention is to provide a container device in which liquid may be poured easily and which is easily cleaned.

Yet another object of the present invention is to provide a container device which is light in weight yet durable even when used with liquids having varying textures.

In practicing the invention, a device comprising a rectangular container having two handles coupled thereto is utilized. Mounted along the longitudinal sides inside the container are two guides which extend in the same plane to about two-thirds of the depth of the container. Positioned in the guides is a tray which may include apertures at the bottom thereof for allowing excess liquid to drain from the tray into the container when a roller is dipped in the liquid in the container and roller over the tray. The tray is easily removable and various trays may be provided depending upon the texture of the liquid being used.

In the drawings, FIGURE 1 is an elevation perspective view of the device in which the invention is incorporated.

FIGURE 2 is a partial-section side view of the container device with a roller positioned therein.

FIGURE 3 is an elevation view of a portion of one type of tray which may be used in the device.

FIGURE 4 is an elevation view of a portion of another type of tray which may be used in the device.

In FIGURE 1, sides 10 and 12, bottom 14, and two ends comprise a rectangular container. Only end 16 can be seen in FIGURE 1, the other end being hidden. Handle 18 is pivotally connected to sides 10 and 12 at a distance from the ends equal to about one-third of the length of the sides. Rivets 20 and 22 or other types of fasteners may be used. Handle 24 is fastened to sides 10 and 12 by rivets 26 and 28 in a manner similar to the connection of handle 18. Rivets 20, 22, 26 and 28 are positioned near the upper edge of sides 10 and 12 and handles 18 and 24 are dimensioned so that an aperture is provided for gripping the handle when it extends over the end. A portion of aperture 30 formed by handle 24 may be seen.

Two guides are disposed within the container along sides 10 and 12, at an acute angle with the top of said sides as shown by FIGURES 1 and 2 to a depth of approximately two-thirds the total depth of the container. The length of each guide is about two-thirds the length of each of the sides of the container. The upper part 34 of guide 32 is cut along a plane perpendicular to side 10. The guide which is not shown is positioned and cut in a manner similar to guide 32.

A tray 36 slides into the container between sides 10 and 12 along grooves which are in the guides. The type of tray used depends on the texture of the liquid stored in the container. The corrugated tray 36 is used with lighter liquids such as enamel or varnish. A screen tray may be used for heavy liquids. A lip 38 on the lower edge of the trap provides a stop for the roller when it is resting on the tray. Holes 40 and 42 provide for draining excess liquid from the tray into the container especially when the roller is rolled upwardly over the tray. At the upper end of tray 36 is another lip 44 which extends on both sides of the tray. Lip 44 acts as a stop to prevent further movement of the tray along the guides and the lip also keeps the handle of the roller from becoming covered with paint when the roller is resting on the tray. Thus lip 44 is utilized as a stop and as a rest.

When the container device is used with a roller for applying liquid such as paint to a surface, the container is filled with liquid to a level just below the bottom edge of the tray. Handles 18 and 24 allow the container device to be pulled or moved along a relatively level surface such as the ground or a scaffold by using only one handle to move the container device. The handles 18 and 24 also may be used to suspend the container device from a hook on a ladder or any convenient location. The container device is designed to prevent spillage during use or during movement from one location to another.

FIGURE 2 shows roller 46 resting on lip 38 of tray 36. Handle 48 of the roller is kept above tray 36 by resting on the upper portion 44a of lip 44 thereby preventing the handle 48 from becoming coated with liquid and eliminating smearing on the hands of a worker who uses the roller. The roller shown is typical of those used by painters.

FIGURE 2 also shows in detail angle pieces 32a and 32b of the guide wherein the tray 36 is engaged with a snug fit. Lower portion 44b of lip 44 acts as a stop for the tray when the tray is positioned inside the container device along the guides which are on sides 10 and 12.

It is obvious from FIGURE 1 and especially FIGURE 2 that when the tray is inserted in the guides and lower lip portion 44b stops the tray by abutting against the outside top of one end of the container, then the lower end of the tray comes to a rest position above the bottom of the container and short of the other end of the container.

When the container device is in operation liquid 50 is poured to a level just below lip 38 of tray 36. Roller 46 is dipped into the liquid and roller on tray 36 to remove excess liquid from roller 46 and to provide a uniform coating of liquid thereon. Excess liquid drains from the tray through the drain holes which are similar to drain hole 42 visible in FIGURE 2. Handles 18 and 24 may be pivotally positioned past the ends of the container device thereby providing easy access into the device for roller 46, for removing tray 36, or for pouring liquid into the device.

FIGURE 3 shows the lower corner of tray 36. Lip 38 does not extend to edge 36a thereby providing an area along the edge for engagement with a guide.

FIGURE 4 shows the lower corner of tray 37 which is used for heavy liquids. Wire mesh 39 may be rigidly mounted between edge members similar to the edge members 41 and 43 shown in FIGURE 4. Lip 38 on the screen tray also provides a clearance area along edge 41a which allows the tray to be slided within the guides of the container device.

While a preferred embodiment of the invention has been shown and described many modifications thereof can be made by one skilled in the art without departing from the spirit of the invention and it is desired to cover by Letters Patent all forms of the invention falling within the scope of the following claims:

1. A container device for liquid to be spread with a roller having a handle, said container device including a bottom, first and second sides, first and second ends, a first handle pivotally coupled to said first and second sides for movement over said first end, a second handle pivotally coupled to said first and second sides for movement over said second end, a tray having an upper and lower lip, said tray providing a uniform amount of paint to the roller, and guides mounted on each of said sides inside the container device and extending downwardly, at an acute angle with the top of said sides and along said sides from one end thereof, substantially less than the length of said sides and for about two-thirds of the depth of said container for receiving said tray with the lower lip of said tray providing a rest for the roller and said upper lip adapted to abut against a portion of one of said container device ends thereby preventing said tray from being inserted more than a particular depth within said guides and providing a rest for said roller handle above said tray.

2. A container device for liquid to be applied with a roller having a handle, said container device including a bottom, sides, ends, first and second handles each pivotally coupled to said sides for movement over said ends, a slidable tray including a screened surface disposed between an upper and lower lip, and guides coupled on each of said sides inside the container and extending downwardly at an acute angle from the open corner of one of said ends and one of said sides along each of said sides for about two-thirds of the depth of said container and for substantially less than the length of said sides for receiving said tray, said lower lip providing a rest for the roller when the same is placed on said tray with said upper lip elevating the roller handle from said tray and means on said tray preventing said tray from contacting said bottom of said container device when said tray is inserted in said guides.

References Cited in the file of this patent

UNITED STATES PATENTS

| | | |
|---|---|---|
| 353,352 | Disrow | Nov. 30, 1886 |
| 1,763,803 | Mermigis | June 17, 1930 |
| 2,521,122 | Lambourne | Sept. 5, 1950 |
| 2,723,410 | Sprung et al. | Nov. 15, 1955 |

FOREIGN PATENTS

| | | |
|---|---|---|
| 1,088,189 | France | Sept. 8, 1954 |